Jan. 25, 1944.           C. S. WEYANDT           2,340,030
                         WEIGHING CONVEYER
                        Filed Oct. 24, 1940          2 Sheets-Sheet 1
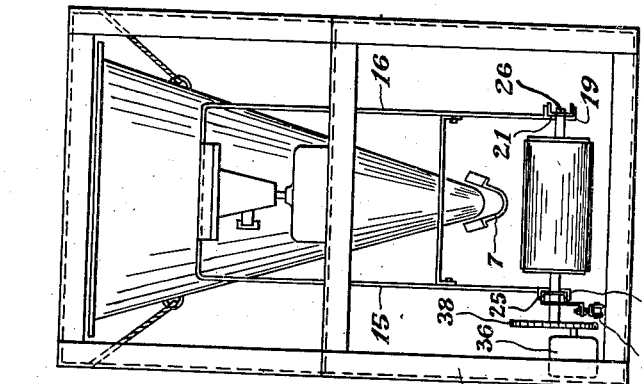
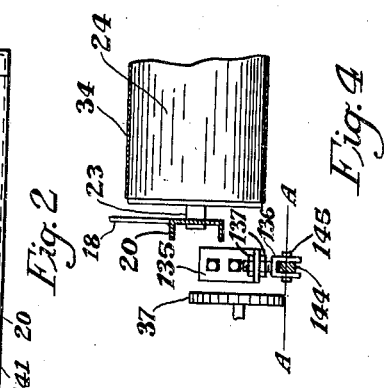
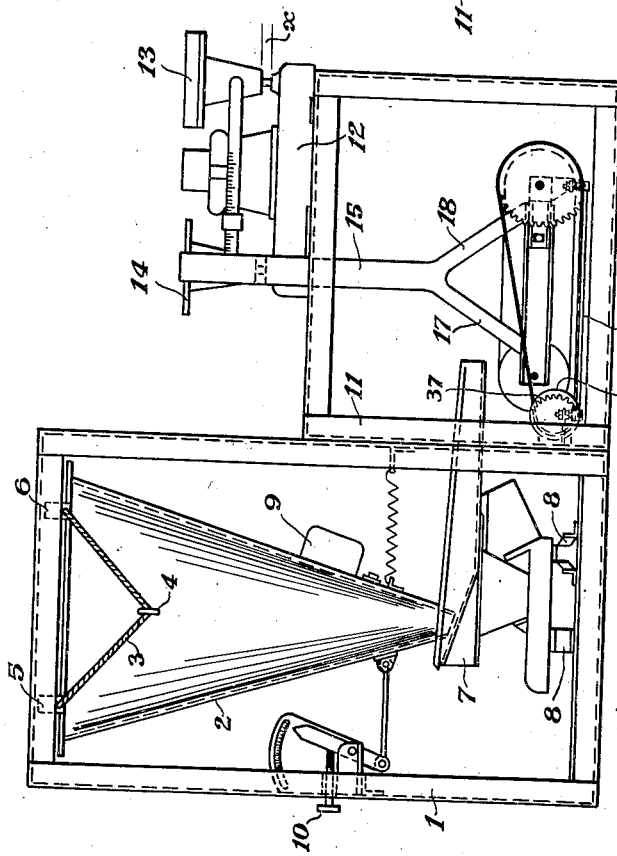
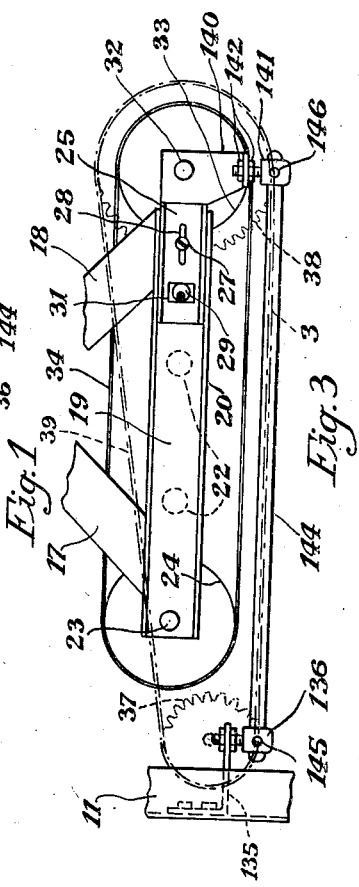
INVENTOR.
Carl S. Weyandt
BY Lewis D. Konigsford
ATTORNEY.

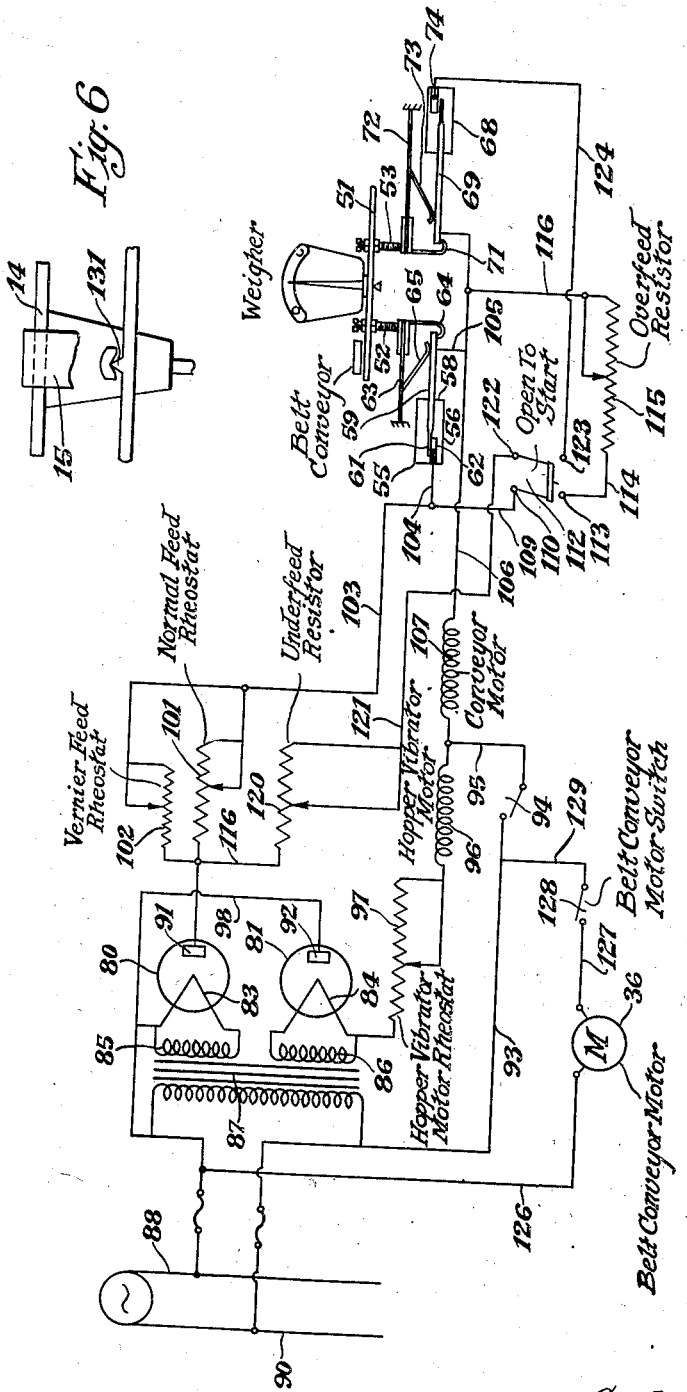

Patented Jan. 25, 1944

2,340,030

UNITED STATES PATENT OFFICE 2,340,030

WEIGHING CONVEYER

Carl S. Weyandt, Homer City, Pa.

Application October 24, 1940, Serial No. 362,500

6 Claims. (Cl. 198—37)

The present invention relates to weighing machines for continuously weighing materials, and in particular is an improvement on the apparatus exemplified by my co-pending application for Weighing and feeding device, Serial No. 148,070, filed June 14, 1937.

In the apparatus as disclosed in said application, which comprises an electrically operated vibratory conveyer that feeds material to a continuously moving belt conveyer mounted on a scale and which is controlled upon movement of the scale to maintain a predetermined feed from the belt conveyer, the motor for driving the belt conveyer is mounted on the same side of the scale as the belt conveyer so that the driving torque has no influence thereon. However, I have found that the mass of the motor on the scale affects the sensitivity of the scale.

It it an object of my invention to provide a weighing machine having an improved sensitivity of control.

A further object is the provision of a feeder machine which will feed bulk material at a predetermined rate within fine limits of accuracy.

According to the present invention, I provide a scale having a conveyer thereon, and I mount the driving motor for the scale conveyer entirely off of the scale and counterbalance any torque effect of the driving motor in a suitable manner and thus obtain a greater sensitivity of the apparatus than when the motor is mounted on the scale. Preferably a chain and sprocket drive is employed between the motor and conveyer, and I preferably employ a torque bar pivotally connected at a fixed point adjacent the motor and to a point on the scale to allow weighing or control movement of the scale while preventing twisting of the scale beam tending to move the scale beam off its pivots, or excessive swinging. Where control means is employed, it may be substantially that of my co-pending application, or I may employ any other suitable type of control means to control the feed to the scale conveyer.

The invention will be described in greater detail in the following specification taken in connection with the accompanying drawings which illustrate a preferred embodiment of the invention by way of example, and wherein:

Figure 1 is a side elevation partly diagrammatic of a preferred embodiment of the invention, Figure 2 is an end view of Figure 1, Figure 3 is an enlarged view of a detail, Figure 4 is a fragmentary end view of Figure 3, Figure 5 is a wiring diagram, and Figure 6 is a diagrammatic view of a detail.

Referring to the drawings, there is shown a frame 1 which may be constructed of channel iron, and a hopper 2 is supported therefrom by cables 3 passing through eye bolts 4 on the hopper and having their ends secured to the frame by suitable clamps 5 and 6. The open mouth of the hopper terminates adjacent a conveyer 7 which preferably is of the vibratory type operated by a suitable vibratory motor, for example, as disclosed in Patent No. 2,187,717, issued to me on January 23, 1940, and is mounted on suitable vibration absorbers 8 on the base of frame 1. A hopper vibrator 9 of any suitable construction preferably is mounted on the hopper 2 and an adjustment 10 is provided for swinging the hopper to vary the space between the hopper mouth and conveyer and thus vary the feed thereto.

A second frame 11 which may be made integral with frame 1, if desired, is located adjacent frame 1, and a scale, designated generally at 12, is suitably mounted on the top thereof. This scale may be of any suitable type or construction and as shown has a weight pan 13 and a load pan 14 on opposite sides of the scale pivot. Two straps 15 and 16 are secured on the load pan 14 in any suitable manner and have arms 17 and 18 which carry a conveyer frame 19. The frame 19, as shown, is made of channel iron, side members 20 and 21 being held together by bars 22 rigidly secured thereto, and at one end a shaft 23 is journalled therein and carries a roller 24. The opposite end of the frame carries two channel members 25 and 26 telescopically arranged and adapted to be clamped in adjusted position by a clamping bolt 27 passing through a slot 28 therein. A fine adjustment of the telescoping members is obtained by means of an eccentric head bolt 29 located in a vertical slot 31 therein. A shaft 32 is journalled in the telescoping members, and carries a roller or drum 33. An endless belt 34 passes over rollers 24 and 33, and it will be apparent that the tension of belt 34 may be adjusted by adjustment of the telescoping members 25 and 26. A constant speed motor 36, which may be of the synchronous type, is suitably secured to the frame 11 and carries a driving sprocket 37 on the shaft thereof. The roller shaft 32 carries a sprocket wheel 38 and an endless chain 39 passing over the sprocket wheels 37 and 38 drives the conveyer belt 34 from the motor 36.

The vibratory conveyer 7 supplies material to the scale conveyer, but any other means or arrangement may be provided to supply material to the scale conveyer, such as a bin, hopper, belt conveyer or the like. The rate of feed of vibratory conveyer 7 may be controlled by varying the current supply thereto or an arrangement may be provided controlled by the state of balance of the scale, as disclosed in said co-pending application which is here briefly described. Referring to Figure 5, a switch operating bar 51 is secured to one side of the scale beam in any suitable manner and carries the contact screws 52 and 53 which are preferably substantially equidistant from the center knife edge bearing and are located as near thereto as practicable. However, if desired, the scale indicator may be employed to control or operate the switches. Also, any suitable type of switch or contact may be employed, the preferred type herein diagrammatically illustrated being of the vacuum type.

Switch 55, shown schematically in Figure 5, comprises a vacuum cylinder 56 permanently closed at one end and closed at the other end by a diaphragm 58 to which is secured in gas tight relation a movable switch operating arm 59. The arm 59 has a contact element 61 at one end which extends to the fixed contact or lead 62 secured to the back fixed wall of the switch cylinder. A spring 63 is fixedly secured at one end and at its other end carries a hook 64 and a second spring 65 is secured to the same support as the spring 63 and has its free rounded end bearing against arm 59 so that the arm normally is held in contact with the hook 64. In unbalanced position the contact screw 52 bears against the spring 63 and upon downward movement of the scale beam on the left the contact arm 59 will break contact with lead 62. For convenience of reference the other limit switch is given the numeral 68 and its contact arm is designated by the numeral 69 operated by hook 71 and springs 72 and 73, and the lead thereof is designated by the numeral 74. In balanced position there is no contact between the adjusting screws 52 and 53 and the springs 63 and 72.

The electrical control system, excluding the limit switches 55 and 68 just described are mounted on a panel enclosed in a suitable control box carried on the same frame. Two thermionic valves 80 and 81 are employed as rectifiers, the filaments 83 and 84 of which are heated from the secondary coils 85 and 86 of transformer 87, which obtains its power from any suitable alternating current source connected to wires 88 and 90. The thermionic valves 80 and 81 have anodes 91 and 92 respectively. One half wave from the alternating current source passes from wire 90 through lead 93 and switch 94 to lead 95, and from thence through the coil 96 of the hopper vibrator 9 and hopper vibrator motor rheostat 97 to the cathode 84, thence to anode 92 and by wire 98 to wire 88. The other half wave passes from wire 88, by lead 98 to the cathode 83 thence to anode 91 and to the normal feed rheostat 101 and vernier rheostat 102 in parallel therewith, and by lead wires 103 and 104 to the terminal 62 of the overfeed switch 55 and thence, when switch 55 is closed, and switch 68 open, through switch arm 59 and lead wires 105 and 106 to the coil 107 of the vibratory conveyer motor, and thence by lead 95, switch 94 and lead 93 to the wire 90. When the scale is in balanced position, switch 55 is closed and switch 68 is open and switch 55 remains closed when the scale is balanced and when the feed is too slow.

The normal feed rheostat 101 and normal feed vernier 102 are also connected by wires 103 and 109 to terminal 110 of switch 112. Terminal 113 of the switch 112 is connected by wire 114 to overfeed resistor 115, which is connected by lead wire 116 to common return wire 106. When switches 55 and 112 are closed the resistance of switch 55 is low enough so that no appreciable current flows across terminals 110, 113 of switch 112, but when switch 55 is opened the resistance 115 is thrown into series connection with the normal and vernier rheostats 101, 102 and cuts down the current supplied to the motor 107 through the path provided by normal feed rheostat 101 and vernier rheostat 102 and by wires 103 and 109 to switch 112 and thence across the terminals 110, 113 to resistor 115, and thence by wire 116 to common return 106.

The underfeed rheostat 120 is connected by wire 121 to terminal 122 of switch 112. The other terminal 123 is connected by wire 124 to switch element 74 of switch 68, and when switch 68 is closed, the circuit is completed through switch rod 69 to the common return 106. Thus, it will be seen overfeed resistor 115 is in series with the normal feed resistor when switch 55 is open, and is not effective when switch 55 is closed, while underfeed resistor 120 is in parallel with the normal feed resistor when switch 68 is closed, but is not effective when switch 68 is open. Resistor 120 preferably is very high relative to normal feed resistor 101, and resistor 115 preferably is very low relative to normal feed resistor 101. This arrangement cuts down the current supply to the motor 107 when the overfeed resistor 115 is cut in, and increases the current when underfeed resistor 120 is cut in. The belt conveyer motor 36 is connected by lead wire 126 to the one alternating current supply wire 88, and by wire 127, switch 128 and wires 129 and 93 to the other alternating current supply wire 90.

To start the operation of the feeder the switch 128 is closed to supply alternating current to the belt conveyer motor 36 which drives the belt conveyer 34 mounted on one pan of the scale. Sufficient weights now are added to the load pan 13 to partly counterbalance the weight of the left scale pan. The switch 94 is now moved to closed position. This energizes the hopper vibrator motor and the conveyer motor 107 and causes material to be moved along the conveyer 7 and onto the continuously moving belt conveyer 34, the hopper vibrator 9 preventing the material from clogging the hopper. While the material is thus being fed onto the uniformly moving belt conveyer 34, the normal feed rheostats 101 and 102 are manually adjusted to vary the discharge of material from conveyer 7 onto the conveyer 34 at the desired or predetermined rate so as to bring the scale into substantial balance.

The switch 112 is now turned to closed position for automatic operation. In closed position of the switch 112 with the scale balanced, switch 55 is closed and switch 68 is open. An underfeed of material causes the switch elements 69 and 74 to contact while switch 55 remains closed and thus resistor 120 is placed in parallel with resistors 101 and 102 whereby an increased current is supplied to the motor coil 107 which speeds up the feed from the conveyer 7 until the point of balance is reached. When balance is reached, contacts 69, 74 are opened, while switch 55 remains closed to thereby restore the normal feed current. If an overfeed occurs the left side moves down, thereby opening switch 55 while switch 68 remains open, which places overfeed resistor 115 in series with the normal feed resistors 101, 102 which cuts down the current and slows down the rate of feed from conveyer 7 until balance is again restored, whereupon switch 55 again closes, while switch 68 remains open. The above described mode of operation takes place as long as current is supplied to the apparatus.

From the description so far pursued it will be apparent that the load pan 14 of the conveyer moves up or down a limited amount during control movement of the scale. The pan 14 is mounted on pivots 131 (Figure 6) and so as the conveyer 34 is carried therewith there is a tendency of the conveyer frame 19 to swing on pivots 131 as it moves up and down. Also, the torque transmitted through driving chain 39 assists this swinging motion and also tends to twist the conveyer suspension straps 15, 16 and the pan 14 on its pivots and thus would interfere with the accuracy of the scale control.

In carrying out the present invention, I limit the swinging movement of the conveyer frame and associated pan and prevent torsional movement thereof. Referring to Figures 3 and 4, a bracket 135 is suitably secured to the frame 11 and carries a clevis 136 secured thereto by lock nuts 137. One belt adjusting piece 25 (Figures 2 and 3) carries an L-shaped extension bracket 140 with a clevis 141 similarly secured thereon by lock nuts 142, and a torque bar 144 is pivotally secured by pins 145 and 146 to the clevises 136 and 141. The pivot axis of pin 145, designated as A—A preferably is vertically below shaft 23 and lies the same radial distance from shaft 23 as the lowermost point of sprocket 37, and the pivot point of pin 146 preferably is similarly located with respect to the driven sprocket 36. The torque bar 144 thus is substantially parallel with the bottom of driving chain 39.

For best results, the torque bar 144 should be of considerable length relative to the possible scale movement indicated at X (Figure 1) so that the vertical movement of the pivot point 146 will not materially depart from rectilinear motion. For example, a ratio of about twenty to one may be satisfactorily employed, although a greater or smaller ratio may be employed depending on the load on the conveyer. The torque bar being in substantially the same plane as the bottom of the driving chain prevents any twisting movement of the conveyer due to the motor driving torque and also limits swinging movement thereof.

What I claim as my invention and desire to secure by Letters Patent of the United States is:

1. A gravimetric conveyer comprising a scale, a conveyer frame pivotally suspended from the scale, a continuously operating belt conveyer mounted on said frame and supported thereby, means for feeding material thereto, electrical control means operated by movement of said scale to control the operation of said feeding means, a motor relatively fixedly mounted off of said scale, means for driving said belt conveyer from said motor and exerting a torque on said scale, and a bar so arranged and pivoted at one end to said frame and having its opposite end pivoted to a rigid support that the distance between said pivots is uniform at all times to counteract said torque and allow control movements of said scale.

2. A gravimetric conveyer comprising a scale, a frame mounted on said scale and supported thereby, a belt conveyer carried on said frame, means controlled by movement of said scale for feeding material thereto, a driven sprocket for said belt conveyer, a rotary motor relatively fixedly mounted off of said scale and having a driving sprocket, an endless chain connecting said sprockets for driving said belt conveyer from said motor and exerting a torque on said scale, and a bar so arranged and pivoted at one end to said frame and having its opposite end pivoted to a rigid support that the distance between said pivots is uniform at all times, said pivots lying in the periphery of said sprockets to counteract said torque and allow control movements of said scale.

3. A gravimetric conveyer comprising a scale, a frame mounted on said scale and supported thereby, an endless conveyer carried on said frame, means controlled by movement of said scale for feeding material thereto, a driven sprocket for said conveyer, a rotary motor relatively fixedly mounted off of said scale and having a driving sprocket, an endless chain connecting said sprockets for driving said conveyer from said motor and exerting a torque on said scale, and a bar so arranged and pivoted at one end to said frame in the periphery of said driven sprocket and having its opposite end pivoted to a rigid support that the distance between said pivots is uniform at all times to counteract said torque and allow control movements of said scale, said bar length being about twenty times the scale movement.

4. A weighing machine comprising a scale, a conveyer frame pivotally suspended from the scale, a continuously operating belt conveyer mounted on said frame and supported thereby, a rotary motor relatively fixedly mounted off of said scale, means for driving said belt conveyer from said motor and exerting a torque on said scale, and a bar so arranged and hinged at one end to said frame and having its opposite end hinged to a rigid support that the distance between said hinge points is uniform at all times to counteract said torque and allow control movements of said scale.

5. A weighing machine comprising a scale, a frame mounted on said scale and supported thereby, a belt conveyer on said frame, a driven sprocket for said belt conveyer, a rotary motor relatively fixedly mounted off of said scale and having a driving sprocket, an endless chain connecting said sprockets for driving said belt conveyer from said motor and exerting a torque on said scale, and a bar so arranged and hinged at one end to said frame and having its opposite end hinged to a rigid support that the distance between said hinge points is uniform at all times, said hinges lying in the periphery of said sprockets to counteract said torque and allow control movements of said scale.

6. A weighing machine comprising a scale, a frame, a conveyer mounted on said frame and supported thereby, a driving sprocket relatively fixedly journalled off of said scale, a driven sprocket for said conveyer driven from the driving sprocket, a bar so arranged and pivoted at one end to said frame and having its opposite end pivoted to a rigid support that the distance between said pivots is uniform at all times to allow control movements of said scale, and means for manually adjusting said pivots radially of the driving and driven sprockets.

CARL S. WEYANDT.